(12) United States Patent
Wylde et al.

(10) Patent No.: US 11,013,232 B2
(45) Date of Patent: May 25, 2021

(54) HYDROTESTING AND MOTHBALLING COMPOSITION AND METHOD OF USING COMBINATION PRODUCTS FOR MULTIFUNCTIONAL WATER TREATMENT

(71) Applicant: Clariant International, Ltd., Muttenz (CH)

(72) Inventors: Jonathan Wylde, The Woodlands, TX (US); David Glasgow, Aberdeenshire (GB); Craig John Kelly, Aberdeenshire (GB)

(73) Assignee: Clariant International Ltd, Muttenz (CH)

( * ) Notice: Subject to any disclaimer, the term of this patent is extended or adjusted under 35 U.S.C. 154(b) by 315 days.

(21) Appl. No.: 15/305,631

(22) PCT Filed: Mar. 25, 2015

(86) PCT No.: PCT/EP2015/000640
§ 371 (c)(1),
(2) Date: Oct. 20, 2016

(87) PCT Pub. No.: WO2015/161911
PCT Pub. Date: Oct. 29, 2015

(65) Prior Publication Data
US 2017/0042145 A1 Feb. 16, 2017

Related U.S. Application Data

(63) Continuation of application No. 14/259,461, filed on Apr. 23, 2014, now abandoned.

(51) Int. Cl.
*A01N 35/02* (2006.01)
*C09K 15/16* (2006.01)
(Continued)

(52) U.S. Cl.
CPC ............. *A01N 35/02* (2013.01); *A01N 33/12* (2013.01); *A01N 57/20* (2013.01); *C02F 1/02* (2013.01);
(Continued)

(58) Field of Classification Search
None
See application file for complete search history.

(56) References Cited

U.S. PATENT DOCUMENTS

| 4,501,667 A | 2/1985 | Cook |
| 5,244,600 A | 9/1993 | Cuisia |

(Continued)

FOREIGN PATENT DOCUMENTS

| WO | 0136713 | 5/2001 |
| WO | WO 2013/007811 | * 1/2013 |

OTHER PUBLICATIONS

Huang, W., Xu, D., Ruschau, G., Wen, J., Hornemann, J., and Gu, T., Laboratory Investigation of MIC Due to Hydrotest using Seawater and Subsequent Exposure to Pipeline Fluiids with and without SRB Spiking. Paper C2012-0001226, (2012).

(Continued)

*Primary Examiner* — Joseph D Anthony
(74) *Attorney, Agent, or Firm* — Tod A. Waldrop

(57) ABSTRACT

This invention relates to a composition, comprising a) at least one quaternary ammonium compound of the formula (I) wherein R is a $C_5$ to $C_{21}$ aliphatic hydrocarbon group, X is an anionic counter ion, and $R^a$, $R^b$ are selected from the group consisting of hydrogen, methyl, ethyl, allyl, propyl, butyl, phenyl or benzyl residues, b) ammonium bisulfite or sodium bisulfite, c) glutaraldehyde or THPS, and d) at least one organic dye.

(Continued)

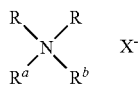

(I)

23 Claims, 10 Drawing Sheets

(51) Int. Cl.
*C02F 1/02* (2006.01)
*A01N 57/20* (2006.01)
*C02F 1/68* (2006.01)
*A01N 33/12* (2006.01)
*C09K 15/02* (2006.01)
*G01M 3/02* (2006.01)
*C09K 11/06* (2006.01)
*C02F 5/12* (2006.01)
*C02F 103/02* (2006.01)
*C02F 1/00* (2006.01)
*C02F 101/12* (2006.01)

(52) U.S. Cl.
CPC ............... *C02F 1/68* (2013.01); *C02F 1/683* (2013.01); *C09K 11/06* (2013.01); *C09K 15/02* (2013.01); *C09K 15/16* (2013.01); *G01M 3/02* (2013.01); *C02F 1/008* (2013.01); *C02F 5/125* (2013.01); *C02F 2101/12* (2013.01); *C02F 2103/02* (2013.01); *C02F 2303/08* (2013.01); *C02F 2303/20* (2013.01); *C09K 2211/1007* (2013.01); *C09K 2211/1088* (2013.01)

(56) References Cited

U.S. PATENT DOCUMENTS

| | | | |
|---|---|---|---|
| 5,385,896 A | 1/1995 | Bryan | |
| 6,815,208 B2 | 11/2004 | Prasad | |
| 7,494,965 B2* | 2/2009 | Caswell | A47F 1/08 510/406 |
| 7,544,651 B2* | 6/2009 | Caswell | A47F 1/08 510/439 |
| 2003/0057401 A1* | 3/2003 | Craig | C09D 5/08 252/387 |

OTHER PUBLICATIONS

International Preliminary Report on Patentability for PCT/EP2015/00640, dated Apr. 7, 2016. 12 pages.
International Search Report for PCT/EP2015/00640, dated Jul. 21, 2015. 2 pages.
Little, B.J. and Lee, J.S. (2007) Microbially Influenced Corrosion. Wiley and Sons, New York, 279 pp.
Penkala, J.E., Fichter, J., and Ramachandran, S., Protection Against Microbiologically Influence Corrosion by Effective Treatment and Monitoring During Hydrotest Shut-In. Paper 10404, 2010. 18 pages.
Powell, D.E., Melancon, B., and Winters, R.H., Guidelines When Conducting Hydrostatic Pressure Tests and Management of Extended Dwell Times Through Dry/Wet Lay-Ups. Paper 11082, (2011). 18 pages.
Ruschau, G., Huang, W., Sullivan, E., and Surkein, M. , Hydrotesting of LNG Tanks Using Untreated Brackish Water. Paper 11216, (2011). 10 pages.

* cited by examiner

OXYGEN SCAVENGING EFFICACY OF THE INVENTION AT 4°C IN SEAWATER SHOWING IMPROVEMENT OVER TYPICAL ADMAC FORMULATIONS AND ANALOGOUS PERFORMANCE TO AMMONIUM BISULFITE ALONE. THE DATA ARE SHOWN IN TABLE 4. THE FIGURE ENTRY "ADMAC FORMULATION" REFERS TO FORMULATION 3.

OXYGEN SCAVENGING EFFICACY OF THE INVENTION AT 25°C IN FRESH WATER SHOWING AN IMPROVEMENT OVER TYPICAL ADMAC FORMULATIONS AND AMMONIUM BISULFITE ALONE. THE DATA ARE SHOWN IN TABLE 5. THE FIGURE ENTRY "ADMAC FORMULATION" REFERS TO FORMULATION 3.

LINEAR POLARIZATION RESISTIVITY (LPR) TRENDS DISPLAYING CORROSION INHIBITION EFFICACY OF THE INVENTION ALONGSIDE TYPICAL PRIOR ART AND INDUSTRY STANDARD CORROSION INHIBITORS. THE DATA ARE SHOWN IN TABLE 6. THE FIGURE ENTRY "ADMAC FORMULATION" REFERS TO FORMULATION 3.

MOST PROBABLE NUMBER (MPN) BACTERIAL KILL EFFICACY OF FORMULATIONS CONSIDERED TO BE PRIOR ART. ALL CHEMICALS WERE FORMULATIONS CONTAINING AMMONIUM BISULFITE ALONG WITH THE NAMED BIOCIDE AND ADDED AT 500 PPM ACTIVE BIOCIDE. THE DATA ARE SHOWN IN TABLE 7.

MOST PROBABLE NUMBER (MPN) BACTERIAL KILL EFFICACY OF THE BEST PERFORMING PRIOR ART CHEMISTRY AND THE NEWLY INVENTED PRODUCTS ALL ADDED AT 500 PPM FORMULATION. THE DATA ARE SHOWN IN TABLE 8.

DNA RESULTS OF ALKYLDIMETHYL AMMONIUM CHLORIDE FORMULATION AT 4°C AND 25°C WITH BOTH CONTROLS SHOWN. THE DATA ARE SHOWN IN TABLE 9.

DNA RESULTS OF GLUTARALDEHYDE 50% AT 4°C AND 25°C WITH BOTH CONTROLS SHOWN. THE DATA ARE SHOWN IN TABLE 9.

HYDROTESTING AND MOTHBALLING COMPOSITION AND METHOD OF USING COMBINATION PRODUCTS FOR MULTIFUNCTIONAL WATER TREATMENT

FIELD OF INVENTION

This invention involves compositions for hydrotesting and/or mothballing of oilfield exploration, drilling and process equipment, including but not restricted to pipelines, process equipment, vessels and tubulars.

More particularly, one embodiment of the present invention is a new hydrotest combination chemical formulation system for demonstrably efficient (synergistic) and simple application where one single product can be applied to perform the four essential roles of a hydrotest chemical; oxygen scavenging, biocidal activity, traceability through use of a dye, and microbially induced corrosion (MIC) inhibition.

BACKGROUND OF THE INVENTION

Towards the end of the construction phase of a piece of oilfield equipment, or after rehabilitation of an existing piece of equipment, it is often necessary to pressure test this equipment for integrity assurance at a pressure above that of its designed working pressure. Pressures are typically conducted at 125% of the planned maximum allowable operating pressure, but may range from 100% to 150%. The duration of the hydrostatic pressure tests may vary depending on the system being tested and the relevant codes and schedules of piping and equipment (Powell, D. E., Melancon, B., and Winters, R. H., (2011) Guidelines When Conducting Hydrostatic Pressure Tests and Management of Extended Dwell Times Through Dry/Wet Lay-Ups. Paper 11082).

Pressure testing is typically performed with water (termed hydrostatic testing). After the pressure test is completed it is not unusual for the hydrotest fluid to remain in the tested equipment for an extended period of time. The fluid used for hydrotesting can be extremely varied in quality and source. In offshore facilities, seawater is invariably used. On land it can be brackish water, river water, lake water or pond water. In both onshore and offshore scenarios, it is also possible for recycled produced water or aquifer water to be used; use of potable water and drill water has also been commonplace. It is possible for any of these water sources to cause corrosion due to several different mechanisms:

Oxygen induced corrosion: most of the water types used for hydrotesting are fully saturated (up to and beyond 8 mg/L) with oxygen. This can cause flash rusting especially around welds where the heat affected zones and weldment material are particular susceptible.

Microbially induced corrosion: this is a major threat to pipelines and storage tanks. While this may be limited during a hydrotest because of a lack of nutrients (if fresh water is used), any biofilm left behind after a hydrotest can further proliferate after the equipment is commissioned resulting in severe localized pitting corrosion (Little, B. J. and Lee, J. S. (2007) [Microbially Influenced Corrosion. Wiley and Sons, New York, 279 pp]). Under-deposit corrosion can also occur as a result of MIC and biofilm build up.

Chloride induced corrosion: depending on the type of water used for the hydrotest, general corrosion can be induced as a result of increased electrolyte in the hydrotesting water.

The severity of the corrosion from the above three mechanisms is reliant upon the quality of water and source of water used for the hydrotest.

Single functionality hydrotest chemicals generally include oxygen scavengers such as ammonium bisulfite or sodium bisulfite; biocides include Pentane-1,5-dial (Pentanedial, Glutaraldehyde, Glutaric acid dialdehyde, Glutaric aldehyde, Glutaric dialdehyde, 1,5-Pentanedial) or Tetrakis (hydroxymethyl)phosphonium sulfate (THPS); corrosion inhibitors typically include proprietary quaternary ammonium compounds, for example as described by Janak and Ludensky, WO 2013/007811 A1. The various single functionality chemicals are also discussed by Penkala, J. E., Fichter, J., and Ramachandran, S. (2010) [Protection Against Microbiologically Influence Corrosion by Effective Treatment and Monitoring During Hydrotest Shut-In. Paper 10404], Ruschau, G., Huang, W., Sullivan, E., and Surkein, M. (2011) [Hydrotesting of LNG Tanks Using Untreated Brackish Water. Paper 11216], Powell, D. E., Melancon, B., and Winters, R. H. (2011) [Guidelines When Conducting Hydrostatic Pressure Tests and Management of Extended Dwell Times Through Dry/Wet Lay-Ups. Paper 11082] and Huang, W., Xu, D., Ruschau, G., Wen, J., Homemann, J., and Gu, T. (2012) [Laboratory Investigation of MIC Due to Hydrotest using Seawater and Subsequent Exposure to Pipeline Fluiids with and without SRB Spiking. Paper C2012-0001226].

Prasad, U.S. Pat. No. 6,815,208 discloses a method for treating hydrotest water to inhibit oxygen corrosion, MIC, and allow the safe discharge of the water. The patent describes a combination treatment plan (using individual chemicals sequentially) that enables reduction of biocide usage by increasing the pH of the hydrotest fluid. The method includes adding an oxygen scavenger to removed oxygen and prevent oxygen corrosion; raising the hydrotest water pH, typically in excess of pH 9.5; then adding a biocide in a reduced amount; and then adding a scale inhibitor to inhibit scale that could have been induced by increasing the pH to alkaline conditions.

Cook, U.S. Pat. No. 4,501,667 describes a process for conditioning metal surfaces to inhibitor corrosion and/or scale deposition using a water soluble salt. The patent claims use of a combination scale and corrosion inhibitor to be used in an aqueous system that can adsorb onto metal surfaces thereby protecting them from scale deposition and corrosion attack.

Cuisia, et al., U.S. Pat. No. 5,244,600 discloses a method for inhibiting or preventing corrosion of metals in contact with an aqueous system containing dissolved oxygen and adding an oxygen scavenger to the system having the formula $(C)_n H_2 OH—COOH$ wherein n is 5 or 6, lactone derivatives, or its water soluble salts, in an amount effective to substantially remove dissolved oxygen.

Bryan, et al., U.S. Pat. No. 5,385,896 claims the use of phosphonium salts, such as Tetrakis hydroxymethyl phosphonium (THP) salts, and aldehydes, such as formaldehyde, exhibiting synergistic biocidal activity. Use of combinations of different biocides can lead to synergism when compared to the individual components.

Craig, U.S. Pat. No. 2003/0057401 discloses water-soluble corrosion inhibitor compositions, useful for inhibiting corrosion of an oil or gas pipeline. The compositions contain a corrosion inhibitor component and a binding agent component and may be applied to the internal surface of a pipeline during or before their construction. When the pipeline is flooded with hydrotest fluid, the compositions dissolve over a period of time and inhibit internal corrosion of the pipe. This patent uses binding agents such as polyacrylamide, polyvinyl alcohol or fish glue to "encapsulate" corrosion inhibitor chemistries into a bound material that can be applied to pipeline pre-commissioning and then release into the hydrotest fluid slowly over time. Janak and Ludensky, WO 2013/007811 describes the prevention and removal of biofilm growth and microbially induced corrosion in gas and/or liquids steams in industrial process systems, such as oil and gas production and gathering systems.

The method comprises the addition of one or more quaternary ammonium compounds $((R^1R^2R^3R^4N^+)_nX^{n-})$ such that the treatment regime involves an initial batch treatment as micelle forming concentrations of that are followed by batch or continuous treatment of the same compounds or alternate biocides.

Although a number of hydrotest chemicals and systems for use in oil and gas industry are known in the prior art, there is a continued need for more effective products and systems. Especially there is still a need for chemical systems that perform multiple tasks during the hydrotest. This is especially true for the more and more common place subsea systems that are very challenging to treat with combinations of single application chemicals. The current invention describes the use of complex blends of chemicals that are able to perform no less than 4 different functions in a hydrotest, including oxygen scavenging, corrosion inhibition, biocidal activity and leak detection via the use of visual dyes.

SUMMARY OF THE INVENTION

It has been found that a a new hydrotest combination chemical formulation system including an oxygen scavenger, biocide, microbially induced corrosion inhibitor, general corrosion inhibitor, localized (pitting) corrosion inhibitor and a visual leak detection dye can be used in pressure testing operations for upstream and downstream oil and gas operations, pipeline commissioning and repair activities, process vessel pressure testing, subsea hydrotesting and process tubular hydrotesting activities.

The primary object of the invention is to provide a simple to use, single use, hydrotest formulation system with strong oxygen scavenging properties, biocidal properties to negate any corrosion due to biological activity, corrosion inhibition due to adsorption to the metal surface and visual leak detection due to the presence of a dye. This has also been formulated in an environmentally acceptable package, as legislated by many different regulatory bodies worldwide (e.g. CEFAS, NICNAS, TSCA, DSL, etc.). This unique combination has superior performance to formulations and individual chemicals disclosed in the prior art. Yet another objective of the present invention is to provide a formulation suitable for application under extreme conditions, such as very high salinities as well as high (up to 100° C.) or low temperatures (down to −10° C.) that are sometimes encountered during the hydrotesting of equipment. The formulations described in this invention can be ubiquitously used in all types of previously described hydrotest fluid matrices such as, but not limited to, seawater, drill water, potable water, river water, pond water, lake water, aquifer water, produced water, and brines.

Other objects and advantages of the present invention will become apparent from the following descriptions, wherein, by way of illustration and example, an embodiment of the present invention is disclosed.

BRIEF DESCRIPTION OF THE DRAWINGS

A detailed description of the embodiments of the present invention is provided herein below, by way of example only, with reference to the accompanying drawings, in which.

DETAILED DESCRIPTION OF THE PREFERRED EMBODIMENTS

Figure 1:
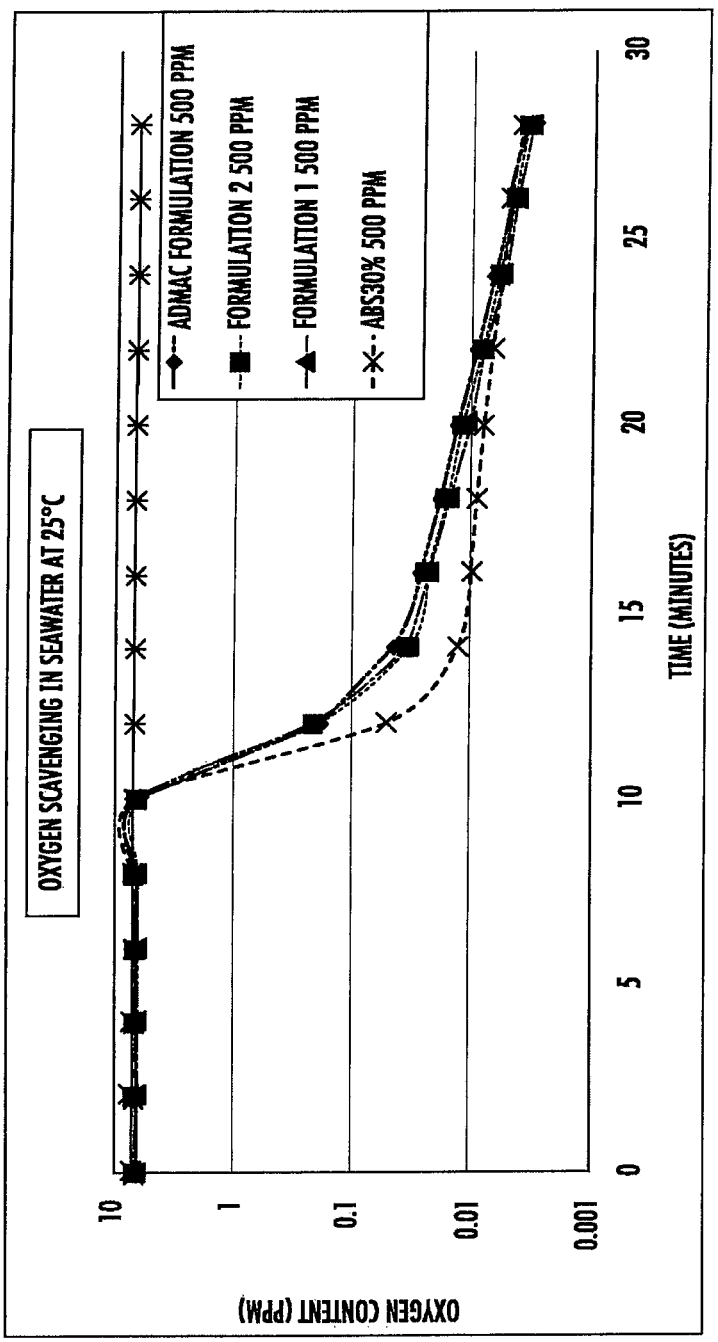
FIG. 1 represents the oxygen scavenging efficacy of the invention when compared to a standard chemistry at 25° C. in seawater showing analogous performance to standard ammonium bisulfite alone.
Figure 2:
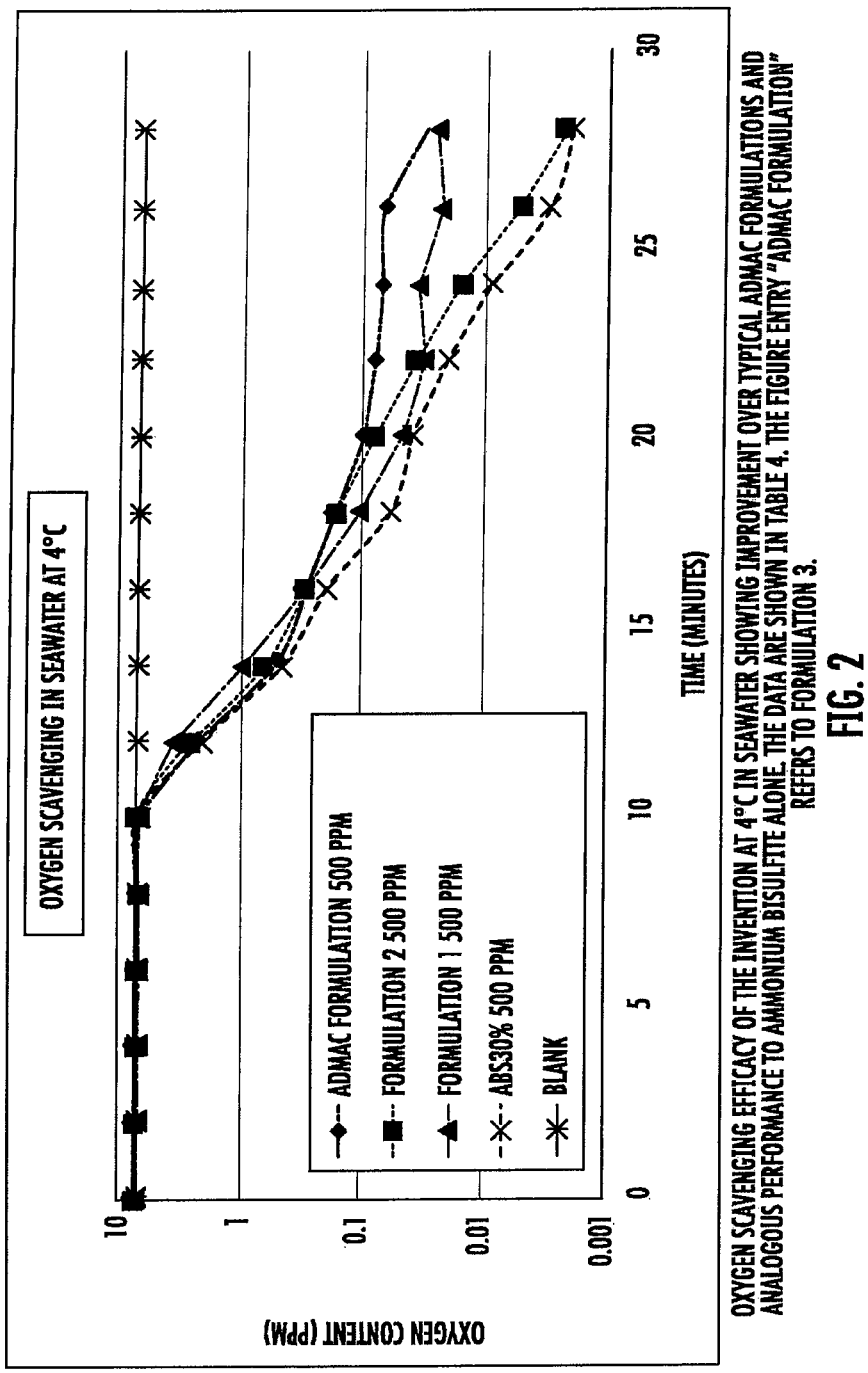
FIG. 2 represents the oxygen scavenging efficacy of the invention when compared to a standard chemistry at 4° C. in seawater showing improvement over Formulation 3 and analogous performance to standard ammonium bisulfite alone.
Figure 3:
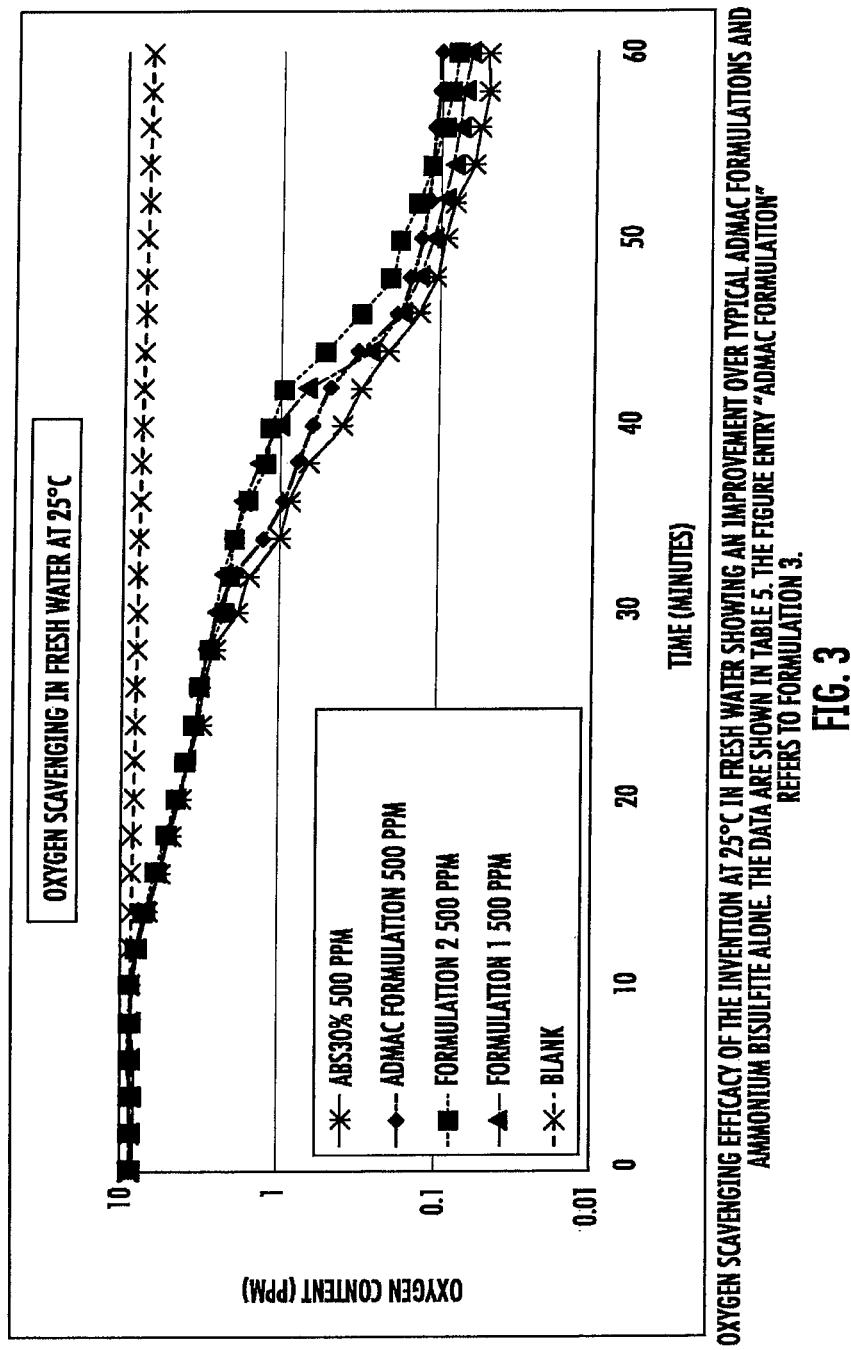
FIG. 3 represents the oxygen scavenging efficacy of the invention at 25° C. in fresh water showing an improvement over the typical Formulation 3 and standard ammonium bisulfite alone.
Figure 4:
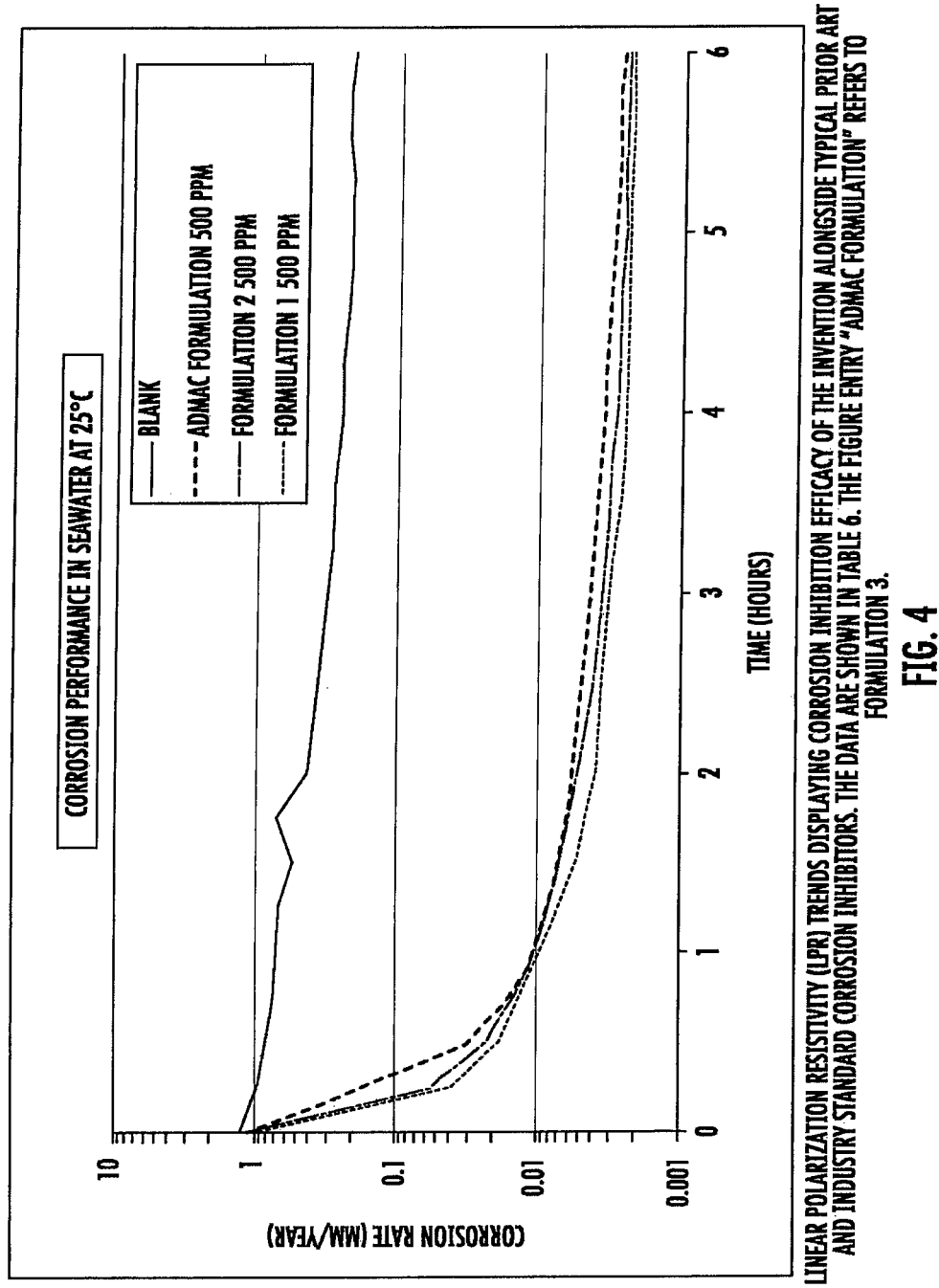
FIG. 4 represents the Linear Polarization Resistivity (LPR) trends displaying corrosion inhibition efficacy of the invention compared to typical prior art and industry standard corrosion inhibitors.
Figure 5:
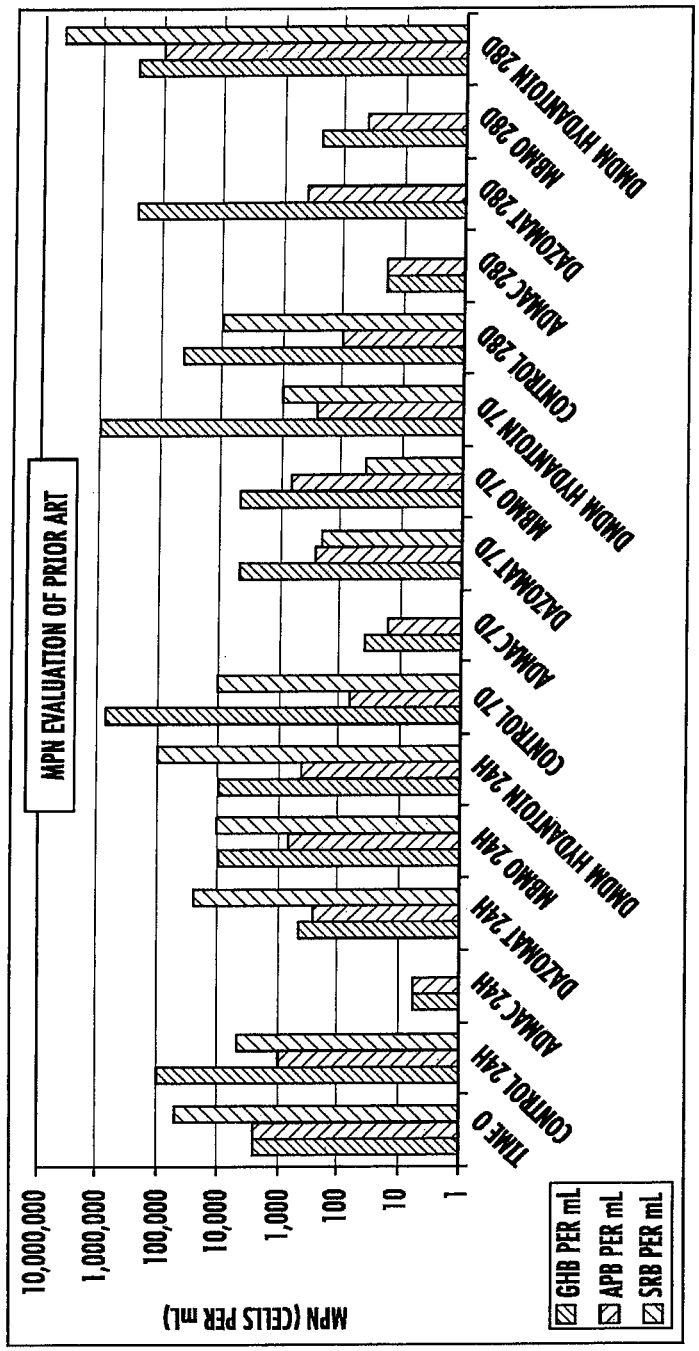
FIG. 5 represents the Most Probably Number (MPN) bacterial kill efficacy of formulations considered to be prior art.
Figure 6:
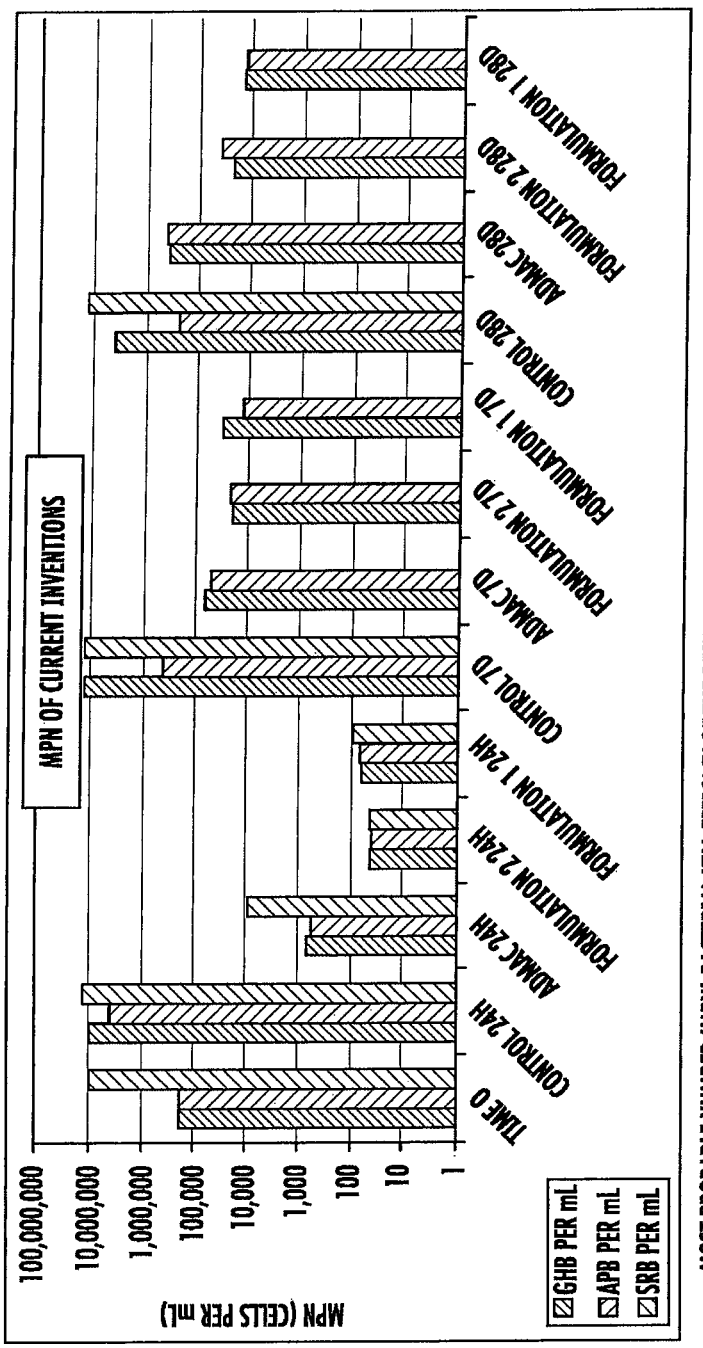
FIG. 6 represents the Most Probably Number (MPN) bacterial kill efficacy of the best performing prior art chemistry and the newly invented products all added at 500 ppm based on the as manufactured formulation.
Figure 7:
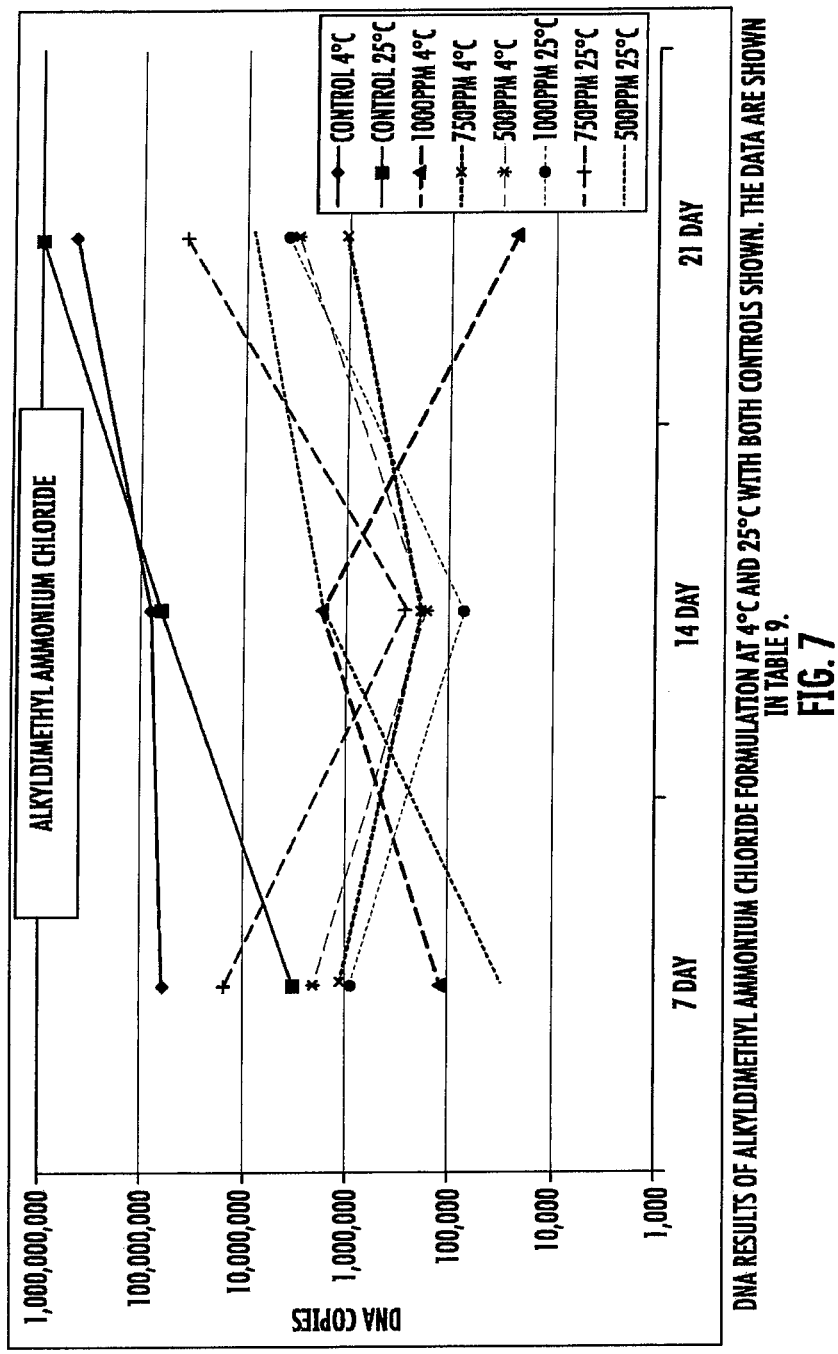
FIG. 7 represents the DNA results of alkyldimethyl ammonium chloride formulation at 4° C. and 25° C. with both controls shown.
Figure 8:
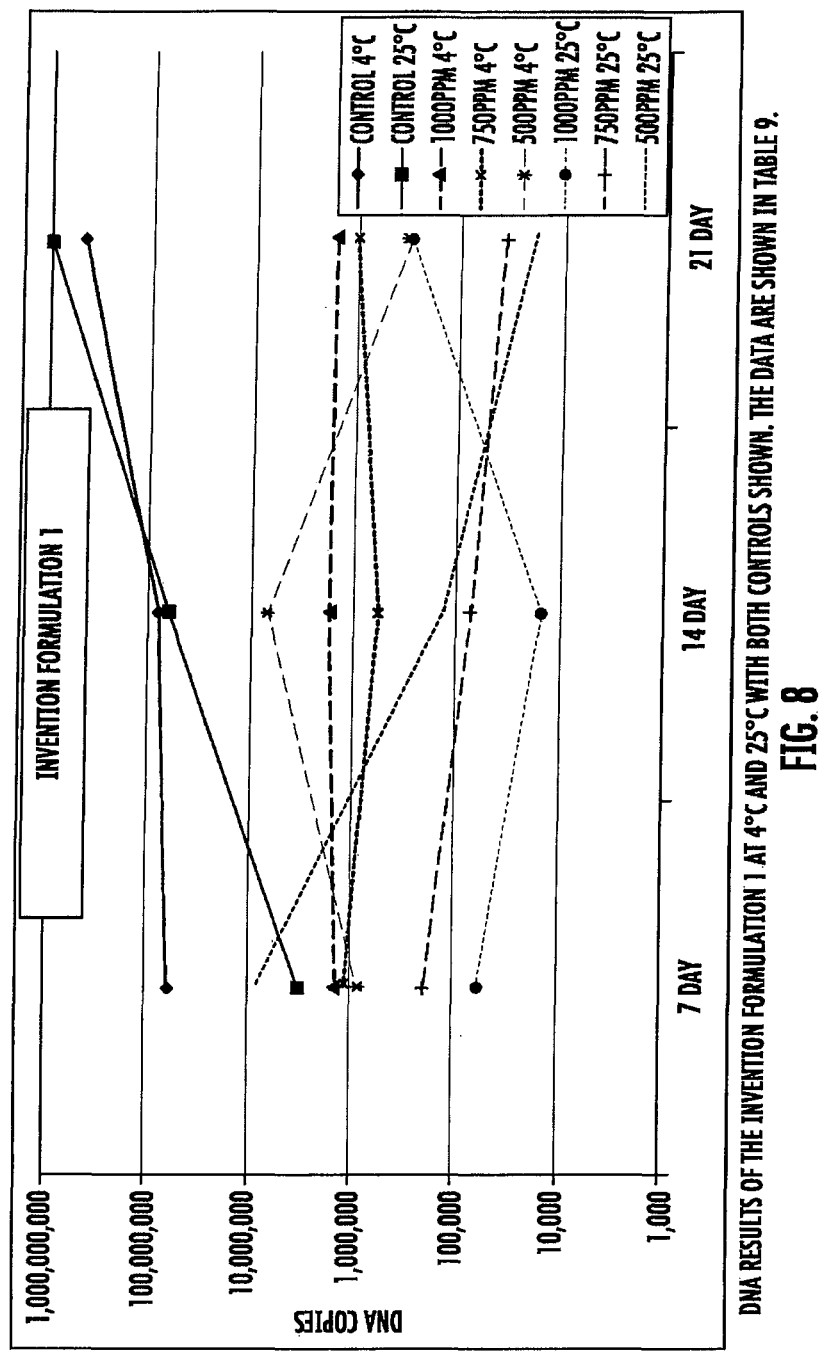
FIG. 8 represents the DNA results of the invention formulation 1 at 4° C. and 25° C. with both controls shown.
Figure 9:
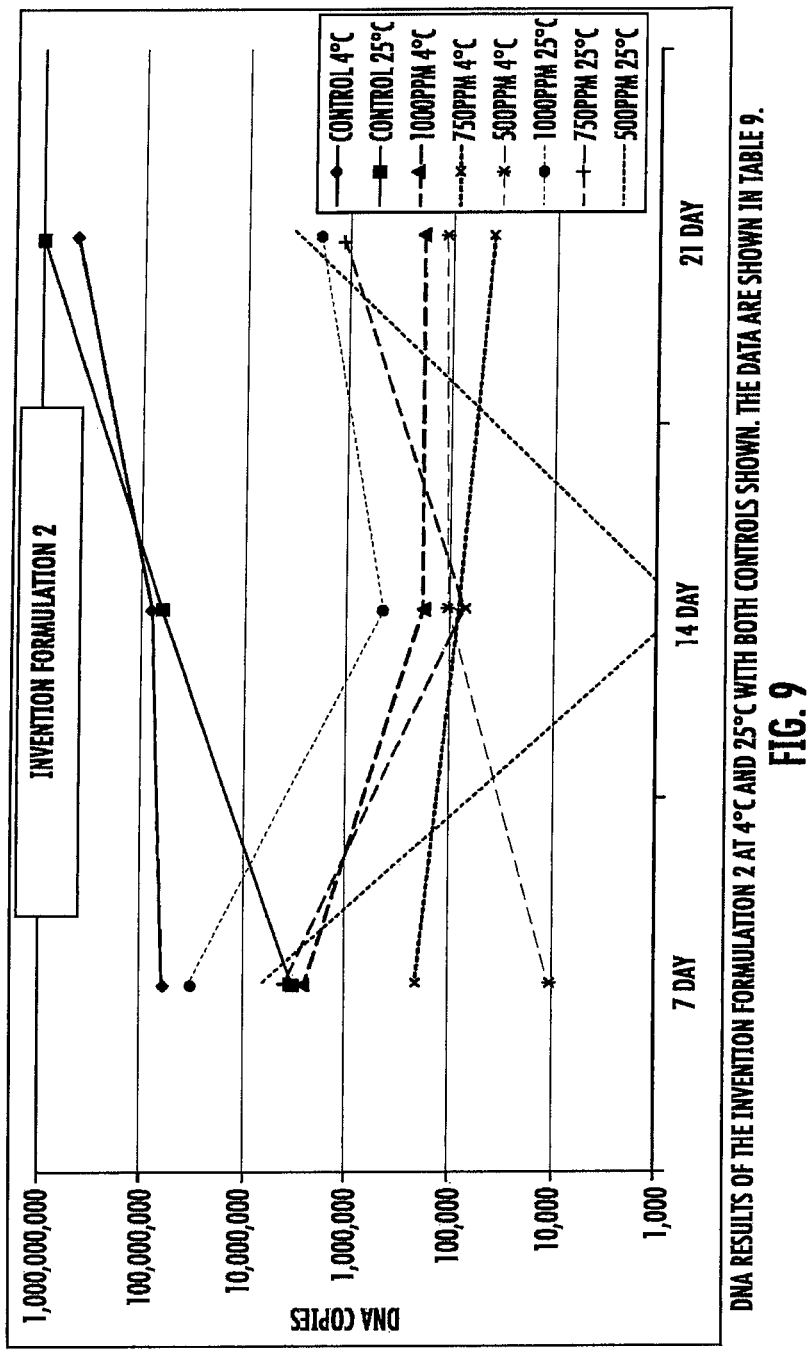
FIG. 9 represents the DNA results of the invention formulation 2 at 4° C. and 25° C. with both controls shown.
Figure 10:
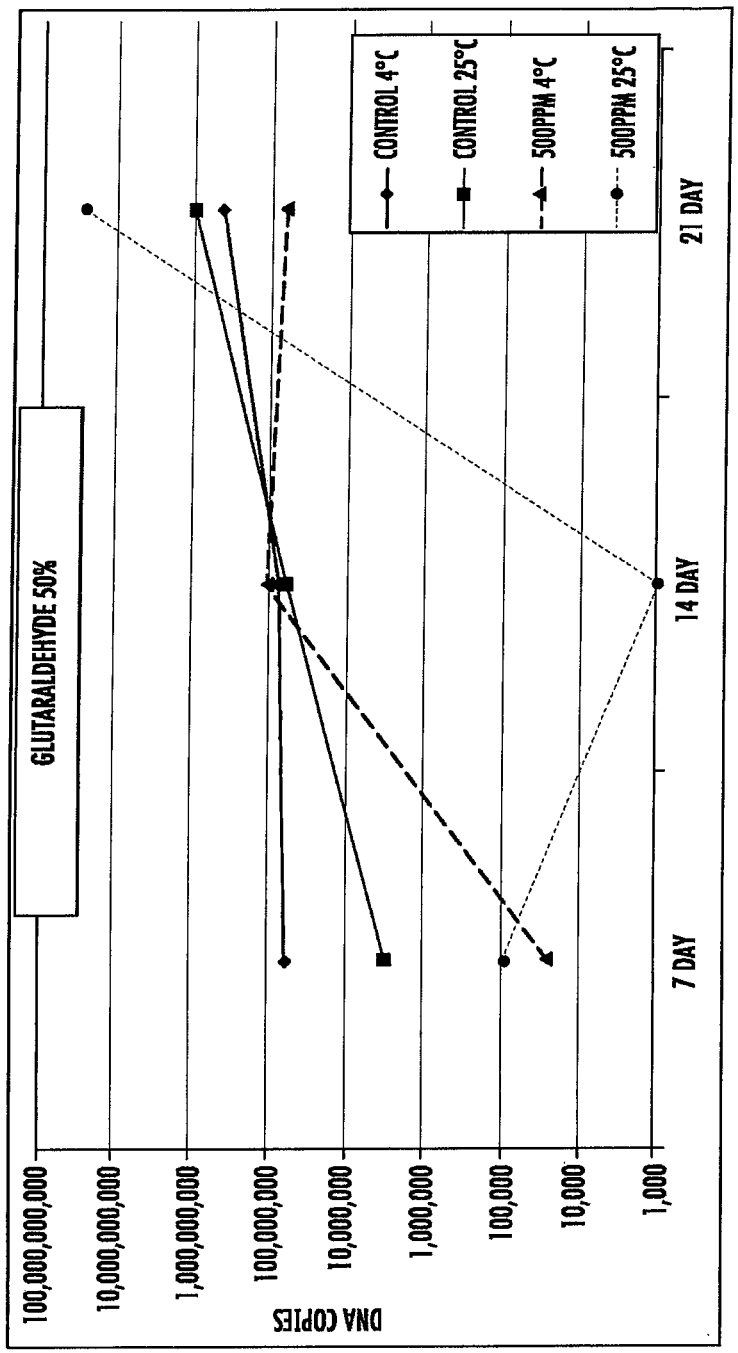
FIG. 10 represents the DNA results of glutaraldehyde 50% at 4° C. and 25° C. with both controls shown.

In a first aspect, this invention relates to a composition, comprising
a) at least one quaternary ammonium compound of the formula (I)

wherein
R is a $C_5$ to $C_{21}$ aliphatic hydrocarbon group,
X is an anionic counter ion, and
$R^a$, $R^b$ are selected from the group consisting of hydrogen, methyl, ethyl, allyl, propyl, butyl, phenyl or benzyl residues,
b) ammonium bisulfite, sodium bisulfite, or both
c) glutaraldehyde, THPS, or both, and
d) at least one organic dye.

In a further aspect, this invention relates to a process for pressure testing oilfield equipment using an aqueous pressure medium, the process comprising adding to the aqueous pressure medium a composition, comprising
a) at least one quaternary ammonium compound of the formula (I)

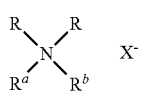

(I)

wherein
R is a $C_5$ to $C_{21}$ aliphatic hydrocarbon group,
X is an anionic counter ion, and
$R^a$, $R^b$ are selected from the group consisting of hydrogen, methyl, ethyl, allyl, propyl, butyl, phenyl or benzyl residues,
b) ammonium bisulfite, sodium bisulfite, or both
c) glutaraldehyde, THPS, or both, and
d) at least one organic dye.

In a further aspect, this invention relates to the use of a composition, comprising
a) at least one quaternary ammonium compound of the formula (I)

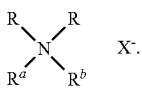

(I)

wherein
R is a $C_5$ to $C_{21}$ aliphatic hydrocarbon group,
X is an anionic counter ion, and
$R^a$, $R^b$ are selected from the group consisting of hydrogen, methyl, ethyl, allyl, propyl, butyl, phenyl or benzyl residues,
b) ammonium bisulfite, sodium bisulfite, or both
c) glutaraldehyde, THPS, or both, and
d) at least one organic dye,
as an additive to an aqueous pressure medium in a process for pressure testing oilfield equipment using said aqueous pressure medium.

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The inventors have found new formulated hydrotest chemical systems, including an oxygen scavenger, biocide, corrosion inhibitor and visual dye, wherein the systems are substantially synergistic, multifunctional and are capable of removing oxygen, controlling general corrosion, localized (pitting) corrosion, microbially induced corrosion, controlling bacterial cultures and being readily detectable visually, or under ultra-violet light. The new hydrotest systems and uses thereof afford rapid control of oxygen, bacteria, and corrosion while being visually detectable in equipment and pipes required to be pressure tested.

The inventors have found that the inventive compositions provide enhanced performance over that of anything in the prior art or indeed the individual components themselves. This is especially the case for the rate of corrosion rate reduction over time, oxygen scavenging and the resistance against high salinity and stability in a large temperature range, compared to prior art hydrotest chemicals and systems.

In certain embodiments, the new stable, hydrotest systems include a quaternary ammonium compound or a plurality of quaternary ammonium compounds, a biocide component or a plurality of biocide components, a co-solvent subsystem and a solvent system including glycols, glycol ethers, alcohols, and water, where dye or dyes includes a number of different xanthene derivatives.

If in the following the expression "subsystem" is mentioned, this expression refers to a component of the claimed composition wherein more than one species of the generically described group of compounds of the respective component is present.

Component a) is quaternary ammonium compound corrosion inhibitor including at least one compound of the formula (I).

In a preferred embodiment, R is selected from $C_5$ to $C_{21}$, more preferably $C_8$ to $C_{14}$ linear or branched alkyl or alkenyl residue.

Particularly preferred are compounds of formula (I) wherein $R^a$ and $R^b$ are methyl or ethyl. Examples of such compounds are alkyldiethyl ammonium chloride with $C_5$ to $C_{21}$ alkyl groups, didecyldimethyl ammonium chloride and didecyldimethyl ammonium bicarbonate.

In another preferred embodiment, X is selected from the group consisting of acetate, polycarboxylates, chloride, bromide, iodide, bicarbonate, carbonate, sulfate and methylsulfate. Particularly preferable are chloride, bicarbonate and carbonate.

In another preferred embodiment, $R^a$ and/or $R^b$ are independently selected from the group consisting of hydrogen, methyl, ethyl, allyl, propyl, butyl, phenyl or benzyl residues.

The quaternary ammonium compound subsystem can additionally include alkyl quaternary compounds such as Alkyltrimethylammonium chloride (e.g. N-Alkyl($C_{12}$-$C_{16}$)—N, N, N-trimethylammonium chloride) and alkyl aryl quaternary compounds such as Alkylbenzyldimethylammonium chloride as these in particular have shown superior adsorption properties which creates enhanced performance in this application. Compounds which may be additionally included correspond to the formula (II)

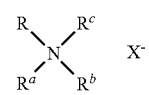

(II)

wherein
R is a $C_5$ to $C_{21}$ aliphatic hydrocarbon group, and preferably is selected from $C_5$ to $C_{21}$, more preferably $C_8$ to $C_{14}$ linear or branched alkyl or alkenyl residues,
X is an anionic counterion, preferably selected from the group consisting of acetate, polycarboxylates, chloride, bromide, iodide, bicarbonate, carbonate, sulfate and methylsulfate, and particularly preferably from chloride, bicarbonate and carbonate, and
$R^a$, $R^b$ and $R^c$ are independently a $C_5$ to $C_{21}$ aliphatic hydrocarbon group, preferably selected from $C_5$ to $C_{21}$, more preferably $C_8$ to $C_{14}$ linear or branched or alkenyl residues, particularly preferred selected from hydrogen, methyl, ethyl, allyl, propyl, butyl, phenyl and benzyl residues.

As component b), the inventive composition comprises an oxygen scavenger component. The oxygen scavenger includes ammonium bisulfite, sodium bisulfite or both. In a preferred embodiment, the oxygen scavenger can additionally include sodium sulfite, hydrazine, diethylhydroxylamine (DEHA), carbohydrazide, erythorbic acid, methylethylketoxime (MEKO), and hydroquinone.

As component c) the inventive composition comprises a synergistic biocidal component, which is selected from glutaraldehyde, THPS and a mixture of glutaraldehyde and THPS. The addition of glutaraldehyde, THPS or both enables a full synergy with the corrosion inhibitor present in the multi-component system. Whereas, some of the quaternary ammonium compounds listed in a) above also can be registered biocides and provide even greater synergy in the formulation. In addition, other biocides selected from the group consisting of Tetrahydro-3, 5-dimethyl-2H-1, 3, 5-thiadiazine-2-thione (Dazomet); N, N'-Methylene bis(5-methyl oxazolidine) (MBMO); 1, 3-Bis(hydroxymethyl)-5, 5-dimethylimidazoline-2, 4-dione (DMDM hydantoin) may be present in the inventive composition.

As component d) the inventive composition comprises a dye. Preferred dyes are selected from the group consisting of fluorescein, disodium salt (9-o-Carboxyphenyl-6-hydroxy-3-isoxanthone, disodium salt); C.I. 45350 disodium salt; C.I. Acid Yellow 73; D&C Yellow No. 8; Disodium 6-hydroxy-3-oxo-9-xanthene-o-benzoate; fluorescein sodium; xanthene dye as shown in Formula (IV) below; 9-(2-carboxyphenol)-3,6-bis(diethylamino)-xanthium chloride (Rhodamin B); C.I. 45170; Basic Violet 10 as shown in Formula (V) below.

The dye provides essential functionality to the formulation insofar as when failure of the pressure test occurs, the dye provides a visual representation of the leak. Even small concentrations of these dyes can be detected due to excitation under specific wavelengths of non-visible light (e.g. UV-light). The current invention preferably utilizes special cosolvent systems, as described in e) and f) below, in order to enable full brine and thermal stability of these dyes in the formulation.

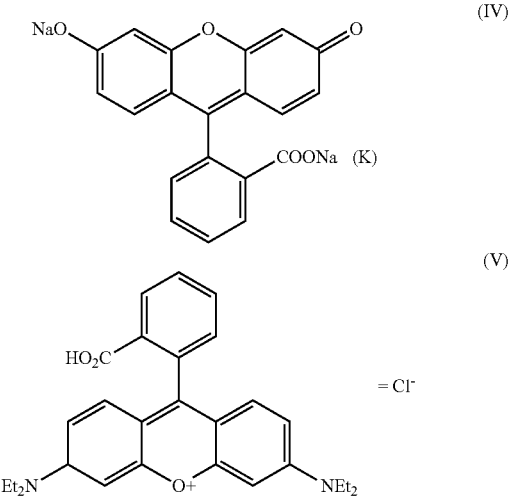

As optionally present component e) the inventive composition preferably comprises a co-solvent subsystem, including at least one alcohol. In a preferred embodiment, this alcohol of the solvent blend may be a monohydric alcohol or a diol. It is believed that the alcohol serves as a coupling agent between the other components in the formulation, thereby stabilizing the hydrotest chemical. The alcohol also lowers the freezing point of the hydrotest chemical. Although propylene glycol is presently more preferred, alternative suitable alcohols include primary, secondary and tertiary monohydric alcohols, with between 1 and 20 carbon atoms and diols with between 2 and 20 carbon atoms, such as isopropanol, t-butanol, n-butanol, n-pentanol, n-hexanol, n-octanol and pentane-diol.

As optionally present component f) the inventive composition preferably comprises a mutual solvent selected from the group consisting of 2-ethyl-hexanol, ethylene glycol ether of 2 ethyl-hexanol, polyethylene glycol ethers of 2 ethyl-hexanol and propylene glycol for better coupling between the components of the formulation and lowering the freezing point of the hydrotesting chemical system. The polyethylene glycol components preferred in this embodiment range in molecular weight from 200 to 2,500 Daltons.

As optionally present component f) the inventive composition preferably comprises water, whereas the water can be fresh water, produced water or brine.

The composition of one embodiment of the present invention is preferably prepared by combining
10 to 70 wt.-% of the quaternary ammonium compounds described in a) above,
1 to 50 wt.-% of the oxygen scavenger described in b) above,
1 to 20 wt.-% of the synergistic biocide described in c) above,
1 to 20 wt.-% of the dye described in d) above,
0, optionally 1 to 30 wt.-% of solvents described in e) and f) above, optionally with the remainder being water as described in g) above.
1 to 25 wt.-% of other compounds selected from the group consisting of polyethylene glycol ethers (varying in molecular weight from 200 to 2,500 Daltons) and inorganic salts may be added to lower the freezing point of the composition, improve stability and performance when necessary.

The hydrotesting chemical systems of this invention are adapted to be added to hydrotest waters for application in pipelines and vessels in concentrations between 100 and 2,000 mg/L. The exact concentration will depend on the hydrotest water type, static conditions, materials of construction of the medium being hydrotested, quality of the water being used to hydrotest and length of time protection is to be provided to the hydrotest water. At this concentration range, the system provides oxygen scavenging, corrosion protection, biocidal activity and suitable visibility due to the dye in order to improve the integrity of the media being hydrotested. Most of the commercially available hydrotest systems for these applications are either single components added sequentially to a hydrotest job, or have been formulated with components that only provide limited functionality, when compared to the current multi-functionality providing composition of the instant invention, or the treating solution is of limited salinity tolerance or temperature stability. Another problem related to the prior art systems is that the kinetics of functionality are slow, either oxygen scavenging taking several days or corrosion rate reduction taking many hours or limited biocidal activity due to interactions between the biocide components and oxygen scavenger. For example, it is well known that THPS reacts with ammonium bisulfite at high concentration, glutaraldehyde reacts with ammonium bisulfite at high concentration.

The present invention also involves a process for conventional and non-conventional applications using the compositions above for pipeline, vessel, tubular, well, or annular hydrotests. The composition of the present invention is preferably used at 100 to 2,000 mg/L of hydrotest fluid. The injected water may be fresh water, produced water, KCl solution, NaCl solution, river water, brackish water, lake water, pond water, or the combination of two or more of these. In general any aqueous liquid used for hydrotesting may be employed. The composition of this invention is added to the water or injection brine and injected into the hydrotest to provide oxygen scavenging, corrosion protection, biocidal control and visual detectability. The injection fluid may contain, in addition to the composition of the instant invention, other ingredients known to those familiar with the art including but not restricted to acids, dispersants, viscosifiers, lubricity agents, scale inhibitors, friction reducers, crosslinker, surfactants, pH adjuster, iron control agents, breakers; this is especially true if produced water (or recycled water) is used to perform the hydrotest.

Employing the composition of the instant invention improves nullification of the hydrotest water to render it benign and non-corrosive and damaging to the integrity of the equipment it will be used to hydrotest, thus allowing better integrity management and control, improved oxygen scavenging, biological control, surface corrosion inhibition protection and visual detectability. Other applications of the formulation of the instantaneous invention include treating water for downhole injection for pressure support, treatment of water for drilling and work-over use, wettability alteration and well cleanout.

EXAMPLES

If not stated otherwise, references to % or ppm mean wt-% or wt.-ppm throughout this specification.

Example 1

Compositions

Hydrotest formulations illustrating different compositional aspects of this invention are listed in Table 1.

TABLE 1

List of compositions of this invention.

| | | Formulation | | |
|---|---|---|---|---|
| | | # 1 | # 2 | # 3 |
| Water | [wt.-%] | 10 | 20 | 20 |
| Glycol | [wt.-%] | 0 | 0 | 0 |
| DDAC | [wt.-%] | 20 | 20 | 0 |
| ABS | [wt.-%] | 30 | 30 | 30 |
| Rhodamin B | [wt.-%] | 10 | 0 | 0 |
| Glutaraldehyde | [wt.-%] | 0 | 0 | 0 |
| ADMAC | [wt.-%] | 0 | 0 | 50 |
| ATMAC | [wt.-%] | 30 | 30 | 0 |

The different materials are as follows:
1.) potable water (component g)) is either potable, deionized, salt water or 3% KCl.;
2.) glycol (component e)) is used as a co-solvent and to decrease the freezing point, this can be mono-ethylene glycol, triethylene glycol, or propylene glycol in these formulations specified, monoethyelene glycol was used throughout;
3.) quaternary ammonium compounds (component a)) such as DDAC described by Formula I, alkyl (in this case lauryl) dimethyl ammonium chloride (ADMAC), N-alkyl, $C_{12-16}$-M,N,N,trimethyl ammonium chloride (ATMAC), as described by formula II, used as a corrosion inhibitor and/or biocidal component;
4.) oxygen scavenging component (component b)) such as ammonium bisulfite (ABS) which is the preferred embodiment;
5.) a visual dye (component d)) such as Rhodamin B which is the preferred embodiment;
6.) a synergistic biocidal component (component c)) such as glutaraldehyde in order to provide a more effective biocidal activity without compromising the overall formulation stability or oxygen scavenging efficacy; glutaraldehyde is the preferred embodiment.

Example 2

Oxygen Scavenging Efficacy

Oxygen scavenging efficacy was evaluated using a real-time orbisphere oxygen sensor with data logging. The test equipment consisted of a stirrer plate and stirrer bar, a 1 liter test cell, circulation pump, flow chamber, oxygen sensor and data logger. Test work was performed using potable water taken from the mains water supply in The Woodlands, Tex. and then using filtered seawater taken from Galveston, Tex. Testing was performed at 4° C. and 25° C. by wrapping the test cell with a monoethylene glycol circulator chiller jacket. A carbon steel stirrer bar was added to the test cell to replicate turbulence that would be created upon pumping the hydrotest fluid using the metallurgy of a typical pipeline. A non-pulsing circulation pump was set to circulate the test fluid past the oxygen sensor at a rate of 10 mL·min$^{-1}$. The oxygen sensor was calibrated prior to every new test run. Each test was run for a duration of 60 minutes with a 10 minute stabilization period prior to the introduction of test chemical. Chemical was injected into the test cell by means of a needle and syringe through a rubber stopper to minimize any oxygen ingress during this stage of the test. Throughout the test, oxygen levels were measured once every minute and the data continuously logged. The water chemistry composition has been given in Table 2 below:

TABLE 2

Seawater and freshwater chemical composition

| Ion | Seawater [mg/L] | Freshwater [mg/L] |
|---|---|---|
| Sodium | 13,917 | 2 |
| Potassium | 460 | 0.05 |
| Calcium | 428 | 10.5 |
| Magnesium | 979 | 4.2 |
| Strontium | 7 | 0 |
| Sulfate | 2,960 | 0.5 |
| Chloride | 19,800 | 3.9 |

All tests of the new formulations (detailed in Table 1) were benchmarked against has 50% ADMAC (specifically lauryl dimethyl ammonium chloride), 30% ammonium bisulfite and 20% water, herein referenced as Formulation 3 and detailed in Table 1. Furthermore ammonium bisulfite was used as a benchmark and the activity matched up to 30% which is the concentration used in all the formulations. Therefore all testing had the same concentration of oxygen scavenging component with the only variable being the other components of the formulation. All tests used 500 ppm of the product, which resulted in the same oxygen scavenger concentration being used in all tests.

The results of testing oxygen scavenging potential in seawater at 25° C. are shown in the following table.

TABLE 3

Oxygen scavenging efficacy of the invention when compared to a standard chemistry at 25° C. in seawater showing analogous performance to standard ammonium bisulfite alone

| Time (minutes) | Blank (ppm $O_2$) | 500 ppm Formulation 3 (ppm $O_2$) | 500 ppm Formulation 1 (ppm $O_2$) | 500 ppm Formulation 2 (ppm $O_2$) | 500 ppm ABS 30% (ppm $O_2$) |
|---|---|---|---|---|---|
| 0 | 7.218 | 6.272 | 6.433 | 6.304 | 7.112 |
| 2 | 7.154 | 6.220 | 6.398 | 6.309 | 7.081 |
| 4 | 7.135 | 6.167 | 6.362 | 6.331 | 7.029 |
| 6 | 7.054 | 6.109 | 6.340 | 6.328 | 7.084 |
| 8 | 7.014 | 6.064 | 6.297 | 6.289 | 7.066 |
| 10 | 7.001 | 6.007 | 6.224 | 6.264 | 7.061 |
| 12 | 6.958 | 0.192 | 0.210 | 0.208 | 0.052 |
| 14 | 6.975 | 0.044 | 0.039 | 0.033 | 0.013 |
| 16 | 6.925 | 0.026 | 0.023 | 0.022 | 0.010 |
| 18 | 6.857 | 0.017 | 0.016 | 0.016 | 0.009 |
| 20 | 6.829 | 0.012 | 0.012 | 0.012 | 0.008 |
| 22 | 6.757 | 0.009 | 0.008 | 0.009 | 0.007 |
| 24 | 6.751 | 0.006 | 0.006 | 0.006 | 0.006 |
| 26 | 6.750 | 0.005 | 0.004 | 0.005 | 0.005 |
| 28 | 6.747 | 0.003 | 0.003 | 0.003 | 0.004 |

It should be noted that all testing was performed so that the concentration of oxygen scavenger was exactly the same in all tests so the only variables were the counter components in the formulations, this isolating the effects that combining components has upon the oxygen scavenging efficacy of the invented products. Therefore all formulations were added at 500 ppm. As can be seen all formulations contained 30% of ammonium bisulfite and this is why ABS 30% was used as a benchmark. The results show analogous performance to the prior Formulation 3 and ammonium bisulfite (ABS) 30% and also all formulated perform to the same ultimate level as ABS 30% alone. This clearly demonstrates that addition of the DDAC and DDABC quaternary ammonium compounds of Formulation 2 does not have any deleterious effects on oxygen scavenging efficacy. Furthermore, adding a dye into the formulation as well as the DDAC and DDABC, as is the case with Formulation 1, has no further negative effects on oxygen scavenging efficacy. It should be noted that scavenging in relatively warm seawater is not a very challenging environment to perform this testing in.

Therefore the following table shows the test performed in seawater but at 4° C. which is a far more challenging environment to scavenge oxygen from.

TABLE 4

Oxygen scavenging efficacy of the invention when compared to a standard chemistry at 4° C. in seawater showing improvement over Formulation 3 and analogous performance to standard ammonium bisulfite alone

| Time (minutes) | Blank (ppm $O_2$) | 500 ppm Formulation 3 (ppm $O_2$) | 500 ppm Formulation 1 (ppm $O_2$) | 500 ppm Formulation 2 (ppm $O_2$) | 500 ppm ABS 30% (ppm $O_2$) |
|---|---|---|---|---|---|
| 0 | 7.278 | 7.554 | 7.434 | 7.445 | 7.554 |
| 2 | 7.157 | 7.432 | 7.310 | 7.243 | 7.452 |
| 4 | 7.153 | 7.361 | 7.188 | 7.088 | 7.357 |
| 6 | 7.195 | 7.309 | 7.071 | 6.961 | 7.268 |
| 8 | 7.077 | 7.138 | 6.915 | 6.749 | 7.121 |
| 10 | 7.035 | 6.945 | 6.812 | 7.190 | 6.997 |
| 12 | 7.014 | 2.224 | 3.599 | 2.684 | 2.125 |
| 14 | 6.987 | 0.527 | 0.956 | 0.645 | 0.454 |
| 16 | 6.966 | 0.312 | 0.301 | 0.289 | 0.269 |
| 18 | 6.934 | 0.175 | 0.110 | 0.165 | 0.064 |
| 20 | 6.911 | 0.142 | 0.048 | 0.081 | 0.047 |
| 22 | 6.884 | 0.080 | 0.033 | 0.037 | 0.029 |
| 24 | 6.872 | 0.071 | 0.036 | 0.015 | 0.009 |
| 26 | 6.851 | 0.071 | 0.024 | 0.005 | 0.003 |
| 28 | 6.823 | 0.032 | 0.026 | 0.002 | 0.002 |

Here it can be seen that Formulation 1 and Formulation 2 outperform Formulation 3 currently employed in the industry and performs as well as ABS 30% alone. The undyed Formulation 2 scavenges oxygen to the same low level of <0.01 ppm as seen in the 25° C. test and when adding dye as in Formulation 1, the scavenging still outperforms the commercially available (non-dyed) Formulation 3. The most challenging test was performed on fresh water, and as can be seen from the following table.

TABLE 5

Oxygen scavenging efficacy of the invention at 25° C. in fresh water showing an improvement over the typical Formulation 3 and standard ammonium bisulfite alone

| Time (minutes) | Blank (ppm $O_2$) | 500 ppm Formulation 3 (ppm $O_2$) | 500 ppm Formulation 1 (ppm $O_2$) | 500 ppm Formulation 2 (ppm $O_2$) | 500 ppm ABS 30% (ppm $O_2$) |
|---|---|---|---|---|---|
| 0 | 8.342 | 8.294 | 8.393 | 8.352 | 8.314 |
| 2 | 8.362 | 8.298 | 8.352 | 8.395 | 8.346 |
| 4 | 8.752 | 8.352 | 8.298 | 8.285 | 8.310 |
| 6 | 8.381 | 8.393 | 8.294 | 8.296 | 8.265 |
| 8 | 8.369 | 8.383 | 8.250 | 8.251 | 8.345 |
| 10 | 8.326 | 8.178 | 8.164 | 8.103 | 8.302 |
| 12 | 8.216 | 7.618 | 7.547 | 7.478 | 7.612 |
| 14 | 8.211 | 6.783 | 6.796 | 6.478 | 6.674 |
| 16 | 8.187 | 5.734 | 5.894 | 5.587 | 5.585 |
| 18 | 8.147 | 4.911 | 4.989 | 4.841 | 4.732 |
| 20 | 8.102 | 4.300 | 4.247 | 4.376 | 4.115 |
| 22 | 8.069 | 3.715 | 3.854 | 3.459 | 3.765 |
| 24 | 8.014 | 3.330 | 3.379 | 3.327 | 3.195 |
| 26 | 7.914 | 3.028 | 3.044 | 3.010 | 3.027 |
| 28 | 7.813 | 2.627 | 2.783 | 2.473 | 2.546 |
| 30 | 7.810 | 2.330 | 2.518 | 2.168 | 1.863 |
| 32 | 7.712 | 1.873 | 2.249 | 2.006 | 1.516 |
| 34 | 7.671 | 1.223 | 1.966 | 1.860 | 1.173 |
| 36 | 7.587 | 0.907 | 1.668 | 1.550 | 0.857 |
| 38 | 7.469 | 0.762 | 1.357 | 1.200 | 0.654 |
| 40 | 7.403 | 0.618 | 1.018 | 1.100 | 0.436 |
| 42 | 7.315 | 0.471 | 0.659 | 0.900 | 0.349 |
| 44 | 7.257 | 0.313 | 0.266 | 0.500 | 0.215 |
| 46 | 7.182 | 0.170 | 0.172 | 0.300 | 0.134 |
| 48 | 7.113 | 0.143 | 0.132 | 0.200 | 0.119 |
| 50 | 7.068 | 0.127 | 0.108 | 0.172 | 0.096 |
| 52 | 7.003 | 0.117 | 0.093 | 0.132 | 0.087 |
| 54 | 6.912 | 0.109 | 0.082 | 0.108 | 0.063 |
| 56 | 6.862 | 0.103 | 0.075 | 0.093 | 0.055 |
| 58 | 6.731 | 0.099 | 0.072 | 0.082 | 0.050 |
| 60 | 6.649 | 0.095 | 0.066 | 0.075 | 0.480 |

As expected, scavenging for all products occurred slower than with seawater. Formulation 1 and Formulation 2 continued to outperform the Formulation 3 in the testing, both scavenging down to a lower level after 60 minutes.

Example 3

Corrosion Inhibition Efficacy

The following table shows the corrosion inhibition efficacy of the invention at 25° C. in a seawater system (Table 2 shows the water chemistry used for seawater).

TABLE 6

Summary of LPR measured corrosion protection of the invention

| Test | Initial corrosion rate [mm/year] | Inhibited corrosion rate [mm/year] | Inhibition Efficiency [%] |
| --- | --- | --- | --- |
| 500 ppm Formulation 3 | 1.009 | 0.002 | 99.8 |
| 500 ppm Formulation 1 | 1.194 | 0.003 | 99.8 |
| 500 ppm Formulation 2 | 0.999 | 0.002 | 99.8 |
| 250 ppm Formulation 3 | 1.158 | 0.015 | 98.7 |
| 250 ppm Formulation 1 | 1.217 | 0.009 | 99.3 |
| 250 ppm Formulation 2 | 1.106 | 0.010 | 99.1 |
| 100 ppm Formulation 3 | 1.291 | 0.197 | 84.7 |
| 100 ppm Formulation 1 | 1.185 | 0.104 | 91.2 |
| 100 ppm Formulation 2 | 1.149 | 0.098 | 91.5 |

A low shear Linear Polarization Resistivity (LPR) electrochemical technique was used to measure the corrosion rate. The blank reading showed a very high initial corrosion rate of 1 mm·yr$^{-1}$. This lowers slightly during the course of the test, as expected as a slightly passivating film of corrosion deposits is established on the carbon steel electrodes. The inhibited tests used the same prior Formulation 3 (as used in previous testing) and the embodiments of the invention as Formulation 1 and Formulation 2. It can be seen that when adding 500 ppm of the formulations the corrosion rate was significantly reduced in all cases. However, it can be seen that Formulation 1 and Formulation 2 outperformed Formulation 3 standard in terms of reducing the corrosion rate quicker, clearly seen during the first 1 hour period, and then resulting in a lower overall corrosion rate. This has been attributed to the better surface chemi-sorption properties of the DDAC and DDABC used in the embodiments of the invention formulations when compared to the other standard tested material.

Different concentrations of the products were used and the above example and the further tests have also been summarized in Table 6. It can be seen that as the dose rate is reduced, the protection of the prior Formulation 3 drops and <85% protection is afforded with 100 ppm of chemical whereas >90% inhibition is offered by both Formulation 1 and Formulation 2.

Example 4

Most Probable Number (MPN) Biocidal Properties

The Most Probably Number technique using a bacterial enumeration technique was performed, as described in NACE International Standard TMP 194-2004. Complex mixed consortia were isolated from seawater and subjected to the chemicals being tested. All chemicals were applied at the same active concentration. Surviving cells were assayed after exposure periods of 1, 7 and 28 days to the numbers compared with a control which received no treatments. The bottle tests were carried out using two mixed consortia—Sulfate Reducing Bacteria (SRB) and General Heterotrophic Bacteria (GHB) that also measured Acid Producing Bacteria (APB) enriched from seawater. Aliquots of the water (1 mL) were inoculated into SRB culture medium and GHB culture medium (Phenol Red Dextrose broth) respectively and sub-cultured twice. The cultures used in the tests were incubated at 30° C. for five days; these were then used to supplement seawater to achieve $10^3$ to $10^4$ SRB cells per mL. For the trial one control bottle and four test bottles were set up. The chemicals were added to the appropriate test bottles to give the final concentrations of each product as supplied. All chemicals were added so that 500 ppm of active biocide was present in each test. The control bottle contained seawater only with no added chemical.

At each time point, (one, seven and twenty-eight days), a sample was removed from each test bottle and the control bottle and used to inoculate the MPN vials. Bacterial counts were performed using the triplicate Most Probable Number method (triplicate MPNs). The inoculated MPN vials were incubated at 30° C. for 7 days for GHB and APB and 28 days for SRB. Results have been reported as cells per mL.

The following table shows the results of testing different biocidal components that can formulate with oxygen scavenger and can be considered to be prior art.

TABLE 7

Most Probably Number (MPN) bacterial kill efficacy of formulations considered to be prior art. All chemicals were formulations containing ammonium bisulfide with the named biocide and added at 500 ppm active biocide

| Test | GHB per mL | APB per mL | SRB per mL |
| --- | --- | --- | --- |
| Time 0 | 2.5E+03 | 2.5E+03 | 4.5E+04 |
| Control 24 h | 9.5E+04 | 9.5E+02 | 4.5E+03 |
| Formulation 3 24 h | 6.0E+00 | 6.0E+00 | 1.0E+00 |
| Dazomat 24 h | 4.5E+02 | 2.5E+02 | 2.5E+04 |
| MBMO 24 h | 9.5E+03 | 7.5E+02 | 9.5E+03 |
| DMDM hydantoin 24 h | 9.5E+03 | 4.5E+02 | 9.5E+04 |
| Control 7 d | 7.5E+05 | 7.0E+01 | 1.0E+04 |
| Formulation 3 7 d | 4.0E+01 | 1.5E+01 | 1.0E+00 |
| Dazomat 7 d | 4.5E+03 | 2.5E+02 | 2.0E+02 |
| MBMO 7 d | 4.5E+03 | 7.5E+02 | 4.0E+01 |
| DMDM hydantoin 7 d | 9.5E+05 | 2.5E+02 | 9.5E+02 |
| Control 28 d | 4.0E+04 | 9.5E+01 | 1.0E+04 |
| Formulation 3 28 d | 2.0E+01 | 2.0E+01 | 1.0E+00 |
| Dazomat 28 d | 2.5E+05 | 4.5E+02 | 1.0E+00 |
| MBMO 28 d | 2.5E+02 | 4.5E+01 | 1.0E+00 |
| DMDM hydantoin 28 d | 2.5E+05 | 9.5E+04 | 4.5E+06 |

The following active biocides contained in hydrotest formulations were tested: Tetrahydro-3, 5-dimethyl-2H-1, 3, 5-thiadiazine-2-thione (Dazomet); N, N'-Methylene bis(5-methyl oxazolidine) (MBMO); 1, 3-Bis(hydroxymethyl)-5, 5-dimethylimidazoline-2, 4-dione (DMDM hydantoin); and Formulation 3. It can be seen from the results that Formulation 3 showed the best effect against planktonic GHB, APB and SRB populations after all time exposures, but after an exposure time numbers slightly recovered again. All other formulated biocides tested appeared to be much less effective against GHB, APB and SRB populations with populations recovering again after an exposure time of 28 days.

Formulation 3 resulted in a 4 log reduction of planktonic GHB and SRB after an exposure time of 24 hours and a 2 log reduction of APB numbers. Both GHB and APB numbers recovered slightly by 1 and 0.5 log after an exposure time of 7 to 28 days. It can be seen that SRB populations never regrew and therefore it can be concluded that Formulation 3 had a long term effect on SRB numbers.

Dazomet reduced GHB numbers by 2.5 log, but did not result in a significant reduction of APB numbers (0.5 log) or SRB numbers after an exposure time of 24 hours. Both GHB and APB numbers recovered again after 7 days. Again, SRB numbers are low after an exposure time of 7 and 28 days, showing that Dazomet has a long term effect on SRB numbers.

The exposure to MBMO resulted in a 1 log reduction of GHB numbers after an exposure time of 24 hours, and a further 2 log reduction after 28 days. The exposure to MBMO did not show to be effective against APB and SRB numbers up to 7 days but a longer term effect was present after extended exposure of 28 days as SRB are reduced to a minimum and GHB reduced relative to the control, although APB were still very active.

DMDM hydantoin resulted in a 1 log reduction of GHB numbers after an exposure time of 24 hours, but numbers recovered again after 7 and 28 days. APB and SRB showed no effect after an exposure time of 24 hours, but increased over the course of trial. Although the SRB control was low after 7 and 28 days, the increase in the test bottles can be seen as a true increase.

A second set of MPN data was generated using the best performing product (Formulation 3) from the first MPN test and this time growing the cultures to a $10^6$ to $10^7$ cells per mL level in order to really test the bacterial control levels in Formulation 3 alongside the embodiments of the invention Formation 1 and Formulation 2; the results can be seen in the following table.

TABLE 8

Most Probably Number (MPN) bacterial kill efficacy of the best performing prior art chemistry and the newly invented products all added at 500 ppm based on the as manufactured formulation.

| Test and time elapsed | GHB per mL | APB per mL | SRB per mL |
|---|---|---|---|
| Time 0 | 2.0E+05 | 2.0E+05 | 1.1E+07 |
| Control 24 h | 1.1E+07 | 4.5E+06 | 1.4E+07 |
| Formulation 3 24 h | 7.0E+02 | 7.0E+02 | 9.5E+03 |
| Formulation 2 24 h | 4.5E+01 | 4.5E+01 | 4.5E+01 |
| Formulation 1 24 h | 7.0E+01 | 7.5E+01 | 9.5E+01 |
| Control 7 d | 1.4E+07 | 4.5E+05 | 1.4E+07 |
| Formulation 3 7 d | 7.5E+04 | 7.5E+04 | 1.0E+00 |
| Formulation 2 7 d | 2.5E+04 | 2.5E+04 | 1.0E+00 |
| Formulation 1 7 d | 3.5E+04 | 1.5E+04 | 1.0E+00 |
| Control 28 d | 4.5E+06 | 2.5E+05 | 1.4E+07 |
| Formulation 3 28 d | 4.5E+05 | 4.5E+05 | 1.0E+00 |
| Formulation 2 28 d | 2.5E+04 | 4.5E+04 | 1.0E+00 |
| Formulation 1 28 d | 1.5E+04 | 1.5E+04 | 1.0E+00 |

All products reduced planktonic SRB numbers by 2 to 3 logs after 24 hours of exposure. All chemical formulations tested reduced the SRB numbers further, over 7 logs in total (when compared to the control) to below the detection limit, these cell numbers remained below detection limit after an exposure time of 28 days. All three biocides under test gave initial reduction of more than 4 logs in planktonic GHB and APB numbers after 24 hours of exposure. Both GHB and APB numbers increased again after an exposure to all three biocides of 7 and 28 days.

It can be seen that both Formulation 1 and Formulation 2 showed superior performance to the best performing commercial formulation (Formulation 3) by up to 2 orders of magnitude kill efficacy.

Example 5

Molecular Technique Biocidal Properties

Molecular techniques were performed on the best performing (Formulation 3) commercial product and the embodiments of the invention Formulation 1 and Formulation 2. This aim of the study was to investigate the efficiency of the biocides on inhibiting 5 species of bacteria in a simulated marine environment. This study was conducted over a 21 day period and involved several marine species of bacteria which have all been previously linked with attributing to corrosion. In this study we aim to demonstrate the inhibition of bacterial growth across the time period of incubation as a result of the biocide treatment. A control was used in the testing and glutaraldehyde was selected for this role.

For each species 3 individual inoculums for each replicate were grown from an isolated single colony picked from agar plates. The species used were *Desulfovibrio desulfricans* (SRB), *Shewanella putrefaciens* (IRB), *Thiobacillus thioparus* (SOB), *Pseudomonas aeruginosa* (biofilm) and *Methanolibacter arachidis* (methanogens). Following 24 hours of incubation on an orbital shaker, cells were centrifuged and the pelleted cells washed with phosphate buffered saline (PBS). Washed cells were then suspended in PBS and measured to a set optical density via UV spectrometry at 600 nm. Each species was then used to inoculate cultures to give a final starter concentration of 0.01 at 600 nm. Each treatment was conducted in triplicate with each replicate being started at alternative time periods to reduce culture bias and human error. Three negative controls and three positive controls were established for each temperature under study.

The trials were conducted in 125 mL Erlenmeyer flasks containing 75 mL of marine broth, which were subsequently autoclaved for 20 min at 121° C. All bottles were incubated at either 4° C. or 25° C. on an orbital shaking platform at 150 rpm. Triplicate biocide treatments were established at each temperature at concentrations of 500, 750 and 1000 ppm. At each weekly interval, 2 mL samples were collected at 7, 14 and 21 days from each bottle. These were subjected to a co-extraction of DNA which was measured with qPCR. The gene target in this study was 16s rDNA a conserved gene present in all bacteria and Achaea.

The following table shows the results of all DNA testing for the four biocides compared to positive controls.

TABLE 9

DNA results of tested formulations and standard biocides

| Test | Dose Rate (ppm) | Temp (° C.) | 7 day DNA (copies) | 14 day DNA (copies) | 21 day DNA (copies) |
|---|---|---|---|---|---|
| Formulation 3 | 1000 | 4 | 1.22E+05 | 1.64E+06 | 2.41E+04 |
| Formulation 3 | 750 | 4 | 1.13E+06 | 1.85E+05 | 1.08E+06 |
| Formulation 3 | 500 | 4 | 2.02E+06 | 1.68E+05 | 3.06E+06 |
| Formulation 3 | 1000 | 25 | 9.23E+05 | 7.28E+04 | 3.73E+06 |
| Formulation 3 | 750 | 25 | 1.50E+07 | 2.45E+05 | 3.75E+07 |
| Formulation 3 | 500 | 25 | 3.18E+04 | 1.70E+06 | 8.19E+06 |
| Formulation 1 | 1000 | 4 | 1.46E+06 | 1.88E+06 | 1.74E+06 |
| Formulation 1 | 750 | 4 | 1.17E+06 | 5.89E+05 | 9.99E+05 |
| Formulation 1 | 500 | 4 | 9.38E+05 | 6.97E+06 | 3.34E+05 |
| Formulation 1 | 1000 | 25 | 6.33E+04 | 1.62E+04 | 3.04E+05 |
| Formulation 1 | 750 | 25 | 1.92E+06 | 4.54E+04 | 1.33E+05 |
| Formulation 1 | 500 | 25 | 8.51E+06 | 1.38E+05 | 2.03E+04 |
| Formulation 2 | 1000 | 4 | 2.52E+06 | 1.77E+05 | 1.81E+05 |
| Formulation 2 | 750 | 4 | 2.00E+05 | 7.97E+04 | 3.79E+04 |
| Formulation 2 | 500 | 4 | 1.02E+04 | 1.01E+05 | 1.15E+05 |

TABLE 9-continued

DNA results of tested formulations and standard biocides

| Test | Dose Rate (ppm) | Temp (° C.) | 7 day DNA (copies) | 14 day DNA (copies) | 21 day DNA (copies) |
|---|---|---|---|---|---|
| Formulation 2 | 1000 | 25 | 3.24E+07 | 4.29E+05 | 1.76E+06 |
| Formulation 2 | 750 | 25 | 3.79E+06 | 7.24E+04 | 1.14E+06 |
| Formulation 2 | 500 | 25 | 6.47E+06 | 4.78E+02 | 3.25E+06 |
| Glutaraldehyde | 500 | 4 | 2.60E+04 | 1.11E+08 | 7.22E+07 |
| Glutaraldehyde | 500 | 25 | 8.85E+04 | 1.00E+03 | 2.51E+10 |
| Positive control | 0 | 4 | 6.12E+07 | 8.15E+07 | 4.59E+08 |
| Negative control | 0 | 4 | 3.07E+04 | 1.21E+03 | 7.61E+03 |
| Positive control | 0 | 25 | 3.22E+06 | 6.22E+07 | 9.53E+08 |
| Negative control | 0 | 25 | 2.53E+05 | 3.63E+07 | 1.19E+11 |

Formulation 3 and Formulation 1 and Formulation 2 treated flasks growth is clearly inhibited with respect to the controls, the 25° C. control is above the scale with a target copy number. The positive control indicates the level of growth expected if no inhibitor is present. The results from the DNA testing for glutaraldehyde shows it to appear ineffective at 4° C. during the first 14 days after which growth appears to be inhibited. Growth in the 4° C. glutaraldehyde reached a 15.8 fold increase when compared to the highest level seen in the other biocides. The data for glutaraldehyde at 25° C. clearly demonstrates the ineffectiveness of this biocide at 500 ppm over a 3 week period. The data shows that growth has been inhibited to some degree compared to the controls however there are still large levels of growth being observed indicating that inhibition rather than total cell death has occurred.

When the highest count in the invention formulation biocide flasks at 25° C. compared to the glutaraldehyde results there is a 670 fold increase in copy number in the glutaraldehyde treated flask. It can also be seen that the embodiments of the invention Formation 1 and Formulation 2 show far more effective biocidal control than Formulation 3.

The invention claimed is:

1. A composition, comprising
a1) at least one quaternary ammonium compound of the formula (I)

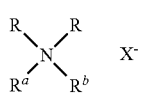

(I)

wherein
R is a $C_5$ to $C_{21}$ aliphatic hydrocarbon group,
X is an anionic counter ion, and
$R^a$, $R^b$ are selected from the group consisting of hydrogen, methyl, ethyl, allyl, propyl, butyl, phenyl or benzyl residues,
and
a2) an alkyl quaternary compound corresponding to the formula (II)

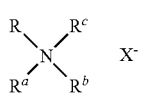

(II)

wherein
R is a $C_5$ to $C_{21}$ aliphatic hydrocarbon group,
X is an anionic counterion and
$R^a$, $R^b$ and $R^c$ are independently selected from the group consisting of hydrogen, methyl, ethyl, allyl, propyl, butyl, phenyl, or benzyl residues,
b) ammonium bisulfite or sodium bisulfite,
c) glutaraldehyde or THPS, and
d) at least one organic dye.

2. The composition according to claim 1, wherein R is a $C_8$ to $C_{14}$ aliphatic hydrocarbon group.

3. The composition according to claim 1, wherein R is a linear or branched alkyl or alkenyl residue.

4. The composition according to claim 1, wherein X is selected from the group consisting of acetate, polycarboxylates, chloride, bromide, iodide, bicarbonate, carbonate, sulfate and methylsulfate.

5. The composition according to claim 1, wherein $R^a$ and/or $R^b$ are independently selected from the group consisting of hydrogen, methyl, ethyl, allyl, propyl, butyl, phenyl or benzyl residues.

6. The composition according to claim 1, wherein component b) additionally comprises an additional oxygen scavenger selected from the group consisting of sodium sulfite, hydrazine, diethylhydroxylamine (DEHA), carbohydrazide, erythorbic acid, methylethylketoxime (MEKO), and hydroquinone.

7. The composition according to claim 1, wherein the composition additionally comprises at least one other biocide selected from the group consisting of Tetrahydro-3, 5-dimethyl-2H-1, 3, 5-thiadiazine-2-thione (Dazomet); N, N'-Methylene bis(5-methyl oxazolidine) (MBMO); 1, 3-Bis (hydroxymethyl)-5, 5-dimethylimidazoline-2, 4-dione (DMDM hydantoin).

8. The composition according to claim 1, wherein component d) is selected from the group consisting of fluorescein, disodium salt (9-o-Carboxyphenyl-6-hydroxy-3-isoxanthone, disodium salt); C.I. 45350 disodium salt; C.I. 766; C.I. Acid Yellow 73; D&C Yellow No. 8; Disodium 6-hydroxy-3-oxo-9-xanthene-o-benzoate; fluorescein sodium; xanthene dye as shown in Formula (IV); 9-(2-carboxyphenol)-3,6-bis(diethylamino)-xanthium chloride (Rhodamin B); C.I. 45170; Basic Violet 10 as shown in Formula (V).

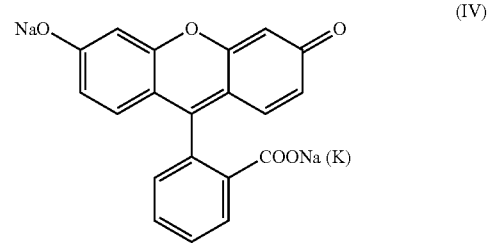

(IV)

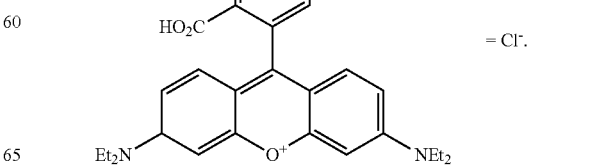

(V)

9. The composition according to claim 1, wherein the composition additionally comprises a co-solvent selected from the group consisting of primary, secondary and tertiary monohydric alcohols with between 1 and 20 carbon atoms, and diols with between 2 and 20 carbon atoms.

10. The composition according to claim 1, wherein the composition additionally comprises a mutual solvent selected from the group consisting of 2-ethyl-hexanol, ethylene glycol ether of 2 ethyl-hexanol, polyethylene glycol ethers of 2 ethyl-hexanol and propylene glycol.

11. The composition according to claim 1, wherein composition additionally comprises water.

12. The composition according to claim 1, wherein 10 to 70 wt.-% of component a1) and a2) are present.

13. The composition according to claim 1, wherein 1 to 50 wt.-% of component b) are present.

14. The composition according to claim 1, wherein 1 to 20 wt.-% of component c) are present.

15. The composition according to claim 1, wherein 1 to 20 wt.-% of component d) are present.

16. The composition according to claim 9, wherein 1 to 30 wt.-% of co-solvent are present.

17. The composition according to claim 10, wherein 1-30 wt.-% of the mutual solvent are present.

18. The composition according to claim 11, wherein water is present ad 100 wt.-%.

19. The composition according to claim 1, wherein 1 to 25 wt.-% of other compounds selected from the group consisting of polyglycolethers and inorganic salts are present.

20. A process for pressure testing oilfield equipment using an aqueous pressure medium, the process comprising adding to the aqueous pressure medium a composition, comprising
   a1) at least one quaternary ammonium compound of the formula (I)

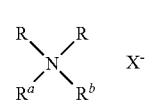

wherein
      R is a $C_5$ to $C_{21}$ aliphatic hydrocarbon group,
      X is an anionic counter ion, and
      $R^a$, $R^b$ are selected from the group consisting of hydrogen, methyl, ethyl, allyl, propyl, butyl, phenyl or benzyl residues,
   a2) an and alkyl quaternary compound corresponding to the formula (II)

wherein
      R is a $C_5$ to $C_{21}$ aliphatic hydrocarbon group,
      X is an anionic counterion and
      $R^a$, $R^b$ and $R^c$ are independently a $C_5$ to $C_{21}$ aliphatic hydrocarbon group,
   b) ammonium bisulfite, sodium bisulfite, or both
   c) glutaraldehyde, THPS, or both, and
   d) at least one organic dye.

21. The process according to claim 20, wherein the composition is present in an amount of 100 to 2,000 mg/L of the aqueous pressure medium.

22. The composition according to claim 1, wherein b) is sodium bisulfite.

23. The composition according to claim 1, wherein $R^a$ and $R^b$ are methyl or ethyl.

* * * * *